(12) United States Patent
Barrow et al.

(10) Patent No.: US 11,468,104 B2
(45) Date of Patent: *Oct. 11, 2022

(54) INTEGRATED CENTRALIZED PROPERTY DATABASE SYSTEMS AND METHODS

(71) Applicant: Eagle View Technologies, Inc., Bellevue, WA (US)

(72) Inventors: Chris Barrow, Woodinville, WA (US); Chris Pershing, Redmond, WA (US); David Kinsman, Woodinville, WA (US)

(73) Assignee: Eagle View Technologies, Inc., Bellevue, WA (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/889,290

(22) Filed: Jun. 1, 2020

(65) Prior Publication Data

US 2020/0387528 A1 Dec. 10, 2020

Related U.S. Application Data

(63) Continuation of application No. 15/049,595, filed on Feb. 22, 2016, now Pat. No. 10,671,648.

(51) Int. Cl.
*G06F 16/29* (2019.01)
(52) U.S. Cl.
CPC .................. *G06F 16/29* (2019.01)

(58) Field of Classification Search
CPC ............... G06F 17/30; G06F 17/3053; G06F 17/30554; G06F 17/30864; G06F 17/30867; G06F 16/29
See application file for complete search history.

(56) References Cited

U.S. PATENT DOCUMENTS

2009/0063424 A1* 3/2009 Iwamura ................. G06F 16/29
2014/0280269 A1 9/2014 Schultz et al.

* cited by examiner

*Primary Examiner* — Truong V Vo
(74) *Attorney, Agent, or Firm* — Dunlap Codding, P.C.

(57) ABSTRACT

Methods and systems are disclosed including a system comprising an integrated centralized property database including a plurality of data items associated with geographic location identifier(s) indicating a particular geographic point on earth, and associated with time identifier(s) including time(s) or time period(s), indicative of a time history of an associated data item regarding the associated geographic point on earth; a computer processor, communicatively coupled with the integrated centralized property database, configured to: receive, from a user computer system, a query of a geographic location and time information indicative of the time history of an associated data item regarding the associated geographic point on earth; retrieve, from the integrated centralized property database, data items having associated geographic location identifiers matching the received geographic location and having associated time identifiers matching the received time information; and provide the retrieved data items to the user computer system via a graphical user interface.

17 Claims, 6 Drawing Sheets

Determine Relevant Geocoding

INTEGRATED CENTRALIZED PROPERTY DATABASE SYSTEMS AND METHODS

CROSS-REFERENCE TO RELATED APPLICATIONS

The present patent application claims priority to the patent application identified by U.S. Ser. No. 15/049,595, filed on Feb. 22, 2016, titled "Integrated Centralized Property Database Systems and Methods"; the entire contents of which is hereby incorporated herein by reference.

BACKGROUND

Technical Field

This disclosure is in the field of aggregating information associated with all geographic points on the earth, where the information is captured from distributed data sources and integrated into a centralized database that may be queried for a complete time history of any geographic point on the earth.

Description of the Related Art

Information about property and the attributes of property, such as title information, geographic characteristics, insurance policies in force, and building and utility information, is usually publically available, but is stored by different entities in different locations using different formats. Some of the information is found by identifying an address or other number that identifies a real estate parcel and then contacting the record keeper of the type of information desired, such as a county records office, about the parcel number or address of the property. In some instances, information of interest may be more quickly found by using the Internet or an aggregator such as Zillow™ or Google Maps™ to access information about the property.

However, this approach to collecting data has a number of drawbacks. First, this data is tracked based on identifiers such as parcels, lots, townships, cities, ZIP Codes, school districts, and the like. These identifiers may have changed over time such that they represent different points on the earth at different times. Second, in the case of parcels, information may be out of date, and information related to the parcel or point of land will be stored in many different locations. In addition, it may be nearly impossible to identify and locate all available information that may relate to that parcel, for example events concerning the parcel that may not be in official county tax base or other government records. Further, many events are stored in different places and different databases. These include events such as crime events, news articles, or private photographs of the location over its various histories.

BRIEF SUMMARY

The present disclosure provides systems and methods to create and maintain an integrated centralized property database containing all information, including a full time history, associated with any given point on the earth. In some embodiments, this point may be identified by latitude and longitude coordinates.

The integrated centralized property database receives information from various data sources, which may include, for example, data sources accessible through the Internet, government databases relating to property, crime data, weather data and the like, as well as any other types of public or private data. The data sources may be located by web crawlers, image crawlers, data feeds or the like, and may be updated periodically to ensure the data stored in the integrated centralized property database is current.

The received data items may be processed to determine relevant category information (e.g., weather data, crime data, demographic data, property sales or change of ownership or classification data, tax assessment data, and so on). Further, the data items may be processed to determine or extract geocoding information, such as latitude, longitude and/or Z-axis information (i.e., height above or depth below the surface of the earth). The category and/or geocoding information may be associated with the data items for storage in the integrated centralized property database. As such, the integrated centralized property database may store a variety of information of all types which is related to one or more geographic points on the earth. Further, the data items may include or be associated with particular date or time information, for example, indicating a time or range of times to which the information pertains.

A user interface is provided which allows users to access the integrated centralized property database. Queries may be performed via the user interface and the integrated centralized property database will be searched for all relevant information associated with the query. For example, a user may input a specific latitude/longitude, and the system will retrieve, and output via the user interface, all relevant information associated with that particular latitude/longitude. The query may further include a time or range of times, in which case, the system will retrieve all relevant information associated with both the input location information (e.g., a particular latitude/longitude, an area defined by an input polygon or the like) and the input time information.

One benefit to the embodiments described herein is that a user can input a query about a location on the earth and receive, from a single database and single server, all activities and information associated with that location, sorted by date and type of activity/information.

One method to carry out one or more embodiments may be summarized as including: storing a plurality of data items in a data aggregation system, each of the plurality of data items being associated with one or more location identifiers indicating a particular point on the earth; receiving, by at least one processor, a query indicating a geographic location; retrieving, from the data aggregation system, data items having associated location identifiers matching the received geographic location; and outputting the retrieved data items.

The one or more location identifiers may include latitude and longitude coordinates of a geographic point on earth. The one or more location identifiers may further include Z-axis coordinates that identifies a distance above or below the earth.

The received geographic location may include a region on the earth. The region on the earth may be identified by multiple geocoded locations, the multiple geocoded locations described in at least latitude and longitude coordinates. At least a portion of the plurality of data items stored in the data aggregation system may further be associated with one or more time identifiers, and the method may further include: receiving, by the at least one processor, a time identifier, wherein retrieving from the data aggregation system may further include retrieving data items having associated time identifiers matching the received time identifier. The time identifier may include one or more time periods. The one or more location identifiers may include content external to the data aggregation system. The stored data items may include at least one of: tax data, building code data, weather data, insurance data, crime data, survey data, school data, demographic data and property data.

One system that can carry out one or more embodiments may be summarized as including: a computer processor; a memory coupled to the processor; and an integrated centralized property database, the processor being configured to: receive from a user computer a query including a location identifier, the location identifier including one of a geocoded location and multiple geocoded locations identifying a polygon, receive from the user computer a time period identifier, retrieve from the integrated centralized property database location data, the location data including data associated with the location identifier and with the time period identifier, and provide the retrieved location data to the user computer via a graphical user interface.

The processor may be further configured to: retrieve parcel information from the integrated centralized property database; compare the retrieved parcel information with the location data to determine parcels associated with the location identifier; and output the parcels associated with the location identifier. The processor may be further configured to: retrieve insurance policy information from the integrated centralized property database; compare the retrieved insurance policy information with the parcels associated with the location identifier to determine the insurance policies associated with the location identifier; and output the insurance policies associated with the location identifier.

The system can be considered as having a means for storing a plurality of data items in a data aggregation system, each of the plurality of data items being associated with one or more location identifiers indicating a particular point on earth; means for receiving a query indicating a geographic location; means for retrieving data items having associated location identifiers matching the received geographic location; and means for outputting the retrieved data items.

DETAILED DESCRIPTION

Figure 1:
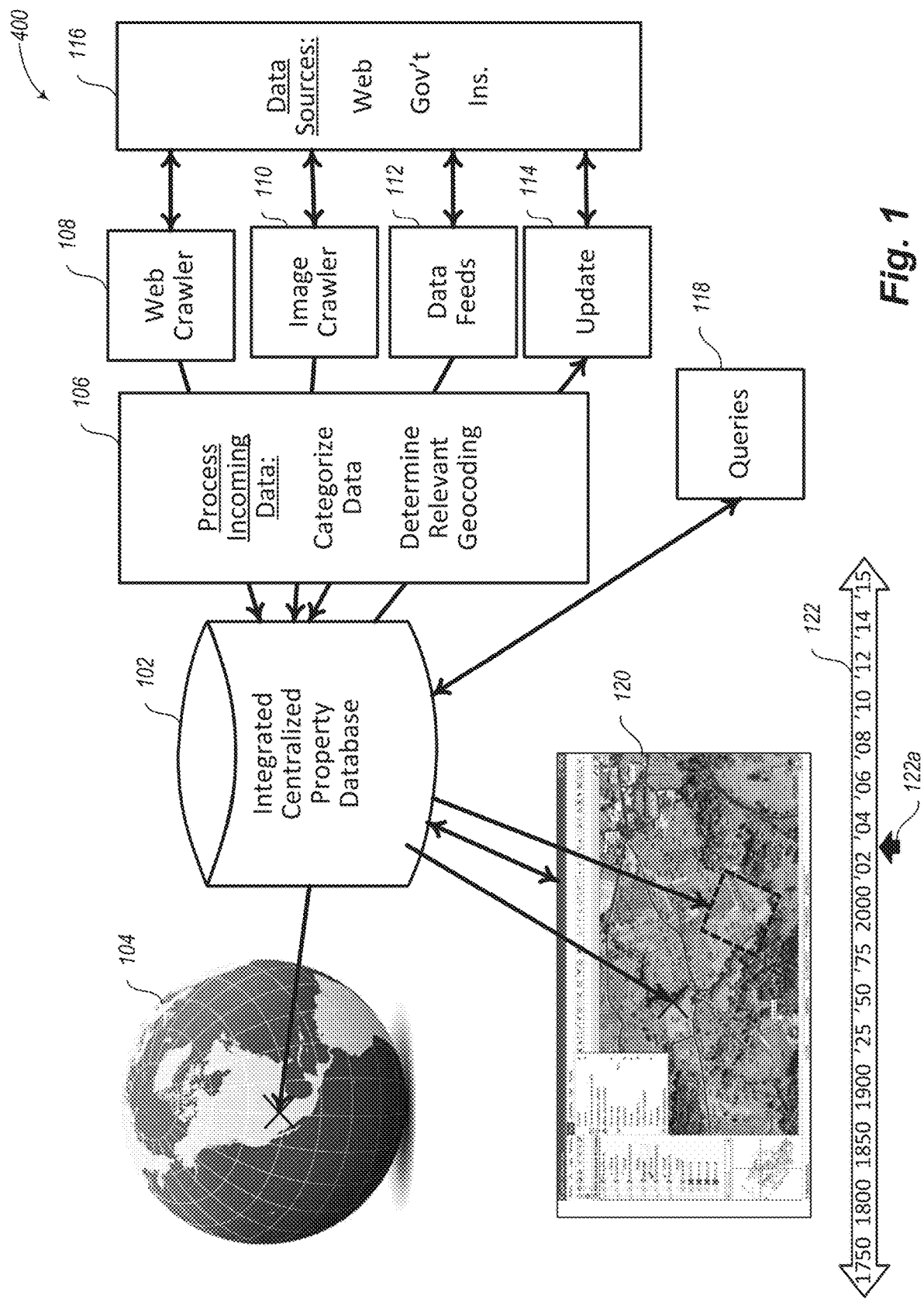
FIG. 1 is a block diagram illustrating an embodiment of an environment in which an integrated centralized property database is used.

An integrated centralized database is disclosed that aggregates all information that is related to, or associated with, any geographic point on the earth, and includes any changes in information over time with respect to that point. A point on the earth is identified by geocoded coordinates, or latitude/longitude. This aggregated information may be related to parcels and buildings associated with that point, insurance claims data, weather data, crime data, demographic data, buildings on that point, reported activities and events, or other related data by time period. The system constantly scans for new information that can be categorized and associated with one or more points on the earth. The centralized database can then be queried to retrieve any and all data related to that point. For example, in one embodiment the simplest query may include providing only a latitude and longitude, and all information related to that point will be retrieved. In other examples, the query may include a request for data associated with locations within a certain proximity to the point. In addition to a single point, queries for information related to multiple points may be performed. In one or more embodiments, the multiple points may be defined by a region, such as by a polygon with vertices identified by a series of geocoded coordinates that include all geographic locations within the polygon area. In other embodiments, a region may be identified by a name or one or more features used to identify a geographic area. In another embodiment, a region defining points may be described as a combination of location description and a point in time. For example, the footprint of the residence building at property address 123 Dry Creek Road, Napa Valley, Calif., on Jul. 4, 1970, or city of Humptulips, Wash., as boundaries were defined on Jan. 31, 1989.

One of the advantages of tracking data associated with a geographic point on the earth is the continuity of location description over time. For example, by using a lot number, a parcel identifier, a county, or city identifier to get information about a specific geographic location, a person is not guaranteed to identify the same geographic location over time. For example, a parcel of land from the 1850s may be the result of the subdivision of a much larger block of land acquired earlier by the state. That parcel may have since been subdivided, and portions of the parcel converted to industrial use with industrial utilities installed and underground storage tanks added. Subsequently, some of the subdivided parcels may have been recombined into new larger parcel and converted into farm use. Several decades later, the larger parcel may have been converted to residential use and subdivided for individual family homes. In this example, it would be difficult to research exactly what happened on the land over the last several hundred years because parcel descriptions of the land were constantly changing. However, each individual geographic point on the earth has a specific history of the parcel associated with it, for example its change of zoning status, which parcels it fell within, who owned it, any permitted improvement, insurance coverage and claims, to whom it was bought and sold, and so on. Therefore, by associating information with one or more geocoded locations on earth, information can be accurately obtained concerning a particular geographic area over any time period.

FIG. 1 is a block diagram 400 which describes an embodiment of an environment in which an integrated centralized property database 102 (which may be referred to at portions herein as "integrated database 102") is used. The integrated database 102 receives its data from a variety of different data sources 116, which may include data accessible from the Internet, data accessible from a government, insurance company or any third-party database, and the like. Data provided from the data sources 116 includes a variety of types of data that is, or can be, associated with a particular location or point on Earth.

Types of Data

A wide range of data may be associated with a particular geographic point on the earth, including but not limited to legal data, property characteristic data, transactional data, environmental data, demographic data, and event data.

Examples of legal data include, but are not limited to, deeds or chains of title that include legal descriptions; boundary descriptions; subdivision information, including parcel changes; tax information on the associated parcel; and liens, mortgages, or other encumbrances ever placed or removed. It may also include government records from the city, county, state, or national levels, pertaining to any real or personal property associated with that point.

In some embodiments, legal data may include transactional data such as purchase, sale, leasing and/or rental agreements including rental contracts, securitization, encumbrance, or other related legal documents, and other documented changes concerning the point that affects ownership or ownership rights. For example, this may include rights involving the point such as mineral rights, water rights, and other land-related rights, as well as transactions regarding buildings or other improvements associated with the point. In these embodiments, the data associated with the point can be used to identify previous owners, previous tenants, and the terms and extent of their holdings.

Legal data may also include insurance contract data that describes, for a particular point, any policy ever written associated with that point, the current policies that are in force, the rates and terms of such policies, any claims made against the policies, and the final outcome of the claim. This data may also include risk management analysis, performed by insurance carriers that did not result in the issuance of any policies. In addition, this information may include photos, tax records, other public records, and property value assessments.

In some embodiments, property characteristic data may be divided into real property and improvements. Real property characteristic data may include elevation, ground slope, soil conditions such as farmland, rocky, marsh, stream, lake, forest, meadow, undeveloped land, paved land, or other. Property characteristic data may also include designations such as floodplain, high risk hail area, or tornado susceptible area.

Improvements characteristic data may include descriptions of one or more buildings on that point; utilities such as water, sewer, electricity or gas running under, though, or over that point; building permits issued or denied, blueprints, on-site photos, videos, inspections, and stop-work and other notices. It may include terrain information such as fill added. In addition, land information associated with the point, but not directly on the point, may include power pole locations, hydrant locations, high-voltage transmission line placement, erosion effects, and vegetation changes. Also, features associated below the point may also be included such as caves, water reserves, mineral deposits, oil reserves or natural gas reserves. Improvement characteristics data may also include analysis in condition data for structures related to the point. For example, reports showing building conditions, such as type of building, square footage, type of materials used in construction, current condition of aspects of the property such as exterior wall conditions, roof conditions and associated roof reports, the results of on-site inspections and analysis, etc. Also included may be construction dates, remodeled dates and demolition dates for buildings, including blueprints and utilities maps for the buildings. In addition to written information, image, video, audio and other methods of capturing information associated with the point may also be stored. For example, aerial images of the property and buildings on the property may be included that come from satellite images, overhead flights, or images captured by property owners, contractors, or service providers, or pictures from other sources, such as recreational photos, that can be associated with that point.

Environmental data may also be associated with the point. For example, standard weather data such as temperature, pressure, precipitation, and the like may be included, along with meteorological data describing major weather events such as tornadoes, hailstorms, lightning, hurricanes, snowstorms, heat waves, and the like that have an impact on the value of the property associated with the point. This data may also include forecasted data, officially reported data, and actual measured data describing the event and its effects. Other examples of events may include earthquakes, floods, and fires that have occurred on the point, or near enough to affect the point.

Other data regarding demographic information, or social data, may be associated with a particular point. For example, average income, education, number of children, crime rates, quality of life measures, school district ratings, unemployment data, weather data, political affiliation data and the like. In addition, consumer and/or business purchase data may also be aggregated and associated with particular points on the earth. For example, the number and type of new car purchases associated with registered vehicle owners having an address listed for that point or within a particular radius of a point. More detailed events may be associated with the property, for example, the contents and date of filed police reports for property associated with the point, specific crime data for criminal record history of people within a region of the point, time and content of any 911 calls or other emergency contacts made from an area associated with the point, and so on.

There are many sources of data associated with a particular address of an activity, an individual, a license, a policy, or other issues. For example, when a person files for any type of license, whether driver's license, fishing license, marriage license, or any approval issued by a state, city, or county, they are frequently required to provide the address of their current residence. This address is a geographic location. At the time that the license is applied for, the address will be a geographic location of a polygon of a certain size. It may be a few thousand square feet, a few acres, or any one of a number of different sizes and shapes. At a different point in time, that same address may represent a different sized or shaped polygon. Accordingly, the address and the date for that address are interesting data points for storage. Additional information is the particular type of license that was requested for that address. For example, a particular address may have one, two, or dozens of people listing that as their address for a type of license or registration. For example, multiple people may list the same address for their driver's license, voter registration, boat registration, and the like. Knowing the number of people that have listed the same address for their voter registration or, similarly, an address associated with a geographic location that is within the same polygon as another address has particular benefits.

Other events that may be of particular interest are whether the address was listed in any form for a purchase of a firearm, a person selling a firearm, or a person requesting a concealed carry permit for a firearm. The address of a person requesting to purchase certain materials, such as chemical compositions, garden fertilizer, and in what quantities and other data may also be of interest.

Many private transactions, not associated with a government entity or license request, are also frequently associated with a particular address. This may include a request for a credit card; joining a private organization such as the Lion's Club, the Boy Scouts of America, the Girl Scouts of America; applying for a private service, such as a telephone installation, having a plumber come visit, having a visit from an electrician, the pumping of a septic tank, installation of a property improvement such as a hot tub, a swimming pool, cutting of trees, the buying or selling of livestock, or any one of a number of transactions which are private as between two individuals or an individual and a company, but in which one of the individuals provides an address that is associated with that particular transaction. This address may then be loaded into any one of a number of available databases, such as into the person's Facebook account, a log record of visits made by a plumbing company, an auctions house listing of the address of people who bought and sold goods, livestock or other items at the auction, or the like. These are instances in which the transactions were private between individuals and no record was made in any government database maintained at a city, county, state, or federal level. However, the database may have become available based on the voluntary listing by one or more of the people involved in the transaction, such as inputting to the business storage records and the then the business records being made available on the Internet, posting to a social media website, such as Facebook, Twitter, Linked In or the like.

In addition, there are two types of data which may be associated with a particular address. One is an event originating from that address and another is an event about that address. For example, a neighbor may call in a complaint about a different property being an eyesore or violating local zoning laws. In that instance, there are two addresses associated with the particular event, the first address is the address of the person who issued the complaint and the second is the address about which the complaint was made. Thus, for a single event, namely a complaint regarding the maintaining of property, there will be two geographic locations associated with that event, one of which will be the geographic location where data originated and another the geographic location of where the event itself is taking place. Thus, for each event there may be multiple addresses associated with that event and each address will have a data field that indicates whether the event occurred at that address or whether the reporting of that event came from that address or some other particular way that the address is associated with the particular event.

Other sources of information between private individuals may include magazine subscription, mailing lists, donations to local causes, donations to charity, or other activities in which one of the parties provides the address at which they will be receiving goods being shipped by another party where the goods are being purchased from Amazon, Barnes & Noble, or any other many thousands of Internet shopping sites which are available.

The data may take a number of different forms including, but not limited to numbers, text, images, graphics, and audio and video. The data may also be in a form readable by a computer or other device, such as a binary form or encrypted form, or in multiple forms that may be combined in one or more ways. In addition, the data may contain references to locations of other data sources. This may include links, such as hypertext links to areas on the internet, or references to other systems, for example executable modules or other computer implemented algorithms, that return data related to the point on the earth.

This data described above represents a very small subset of all possible data that could be associated with a particular point on the earth. The data provided from data sources 116 may include any such type of data that could be associated with a particular point on the earth, including the types described above, and may be provided from data sources 116 including those described above.

Collecting Data

Data related to a point on the earth is collected from data sources 116 in a variety of ways. In some embodiments, web crawlers 108 are used to search for data or updates to data in a systematic way throughout the Internet to search for data concerning regions that are associated with particular points on the earth. For example, given a particular point and a particular time, the web crawler 108 will identify and collect the information, such as described above, on the parcels, neighborhoods, cities, counties, and state with which the point is associated.

In addition, image crawlers 110 may be used to systematically examine images, accessible via the internet or other sources, and image metadata associated with each image. Metadata may include, for example, an image title, image description, or latitude/longitude at which the picture was taken. For example, the image crawler 110 may find an image taken at a wedding held in a field next to a property where the background of the image includes the property. The metadata in the picture may include the latitude and longitude of the camera location, the time the image was captured, and the cardinal direction the camera was pointing. From this information, the image crawler 110 can determine that the image is relevant to the point of the earth if, for example, the image shows part of a building at the point. Additionally, or alternatively, the image may be relevant simply because it depicts a scene at the point of the earth at a particular point in time. The image crawler 110 would then add this image and its metadata information (e.g., before or after further processing) to the integrated centralized property database 102.

Further, data may be collected from data sources 116 via data feeds 112. Data feeds 112 may include feeds of data from any type of data source 116. For example, data feeds 112 may include subscription-based data (which may be provided for free, or for a charge) that is periodically updated and pushed to the integrated centralized property database 102. Examples of data feeds 112 may include, for example, a weather data feed that provides a continuous or periodic stream of data relating to weather conditions or forecasts. Similarly, data feeds 112 may include a police or other government service feed, which may provide a feed of data relating to criminal activity, civil complaints, road conditions and the like that may be associated with one or more geographic locations. Data feeds 112 may further include feeds from emergency or alerting services, such as Amber Alerts, weather event warning systems (e.g., a data feed providing warnings for hurricanes, tsunamis, tornados, earthquakes, snowstorms, or the like).

Additionally, data feeds 112 may include publicly- or privately-accessible social network data (e.g., Twitter, Facebook, Google+, Instagram, Picasa, etc.). Such social network data commonly includes user-uploaded images, text, documents and the like which may be associated with a particular point on the earth. As such, social network data may contain relevant data which may be provided as part of a data feed, or alternatively, which may be discovered by a web crawler 108 and/or image crawler 110.

Data feeds 112 may further include feeds of data relating to changes in status of property, such as, for example, data indicating a sale of a home, data indicating a rezoning or change in zoning for a particular geographic location or the like.

As discussed above, information may be collected from a number of data sources 116. These may include, for example, the public Internet, private/restricted Internet sites such as those requiring a subscription, and governmental sites. In addition, public and private data aggregation sources may also be used as data sources 116, for example those having real estate and demographic information such as Zillow, Trulia, Realtor.com, and others. In some embodiments, data, such as property characteristic data, can be purchased from other data sources 116 and included in systems using the integrated centralized property database 102, either electronically or acquired in print and scanned in. Through these or other embodiments, data relating to any particular point of property on earth may be mined anywhere in the world.

Processing and Storing Data

The collected data may be aggregated, centralized, stored and accessed in a number of different ways in various embodiments. Processing of incoming data may be accomplished by a processor 106. In one embodiment, the integrated database 102 may consist of one database with multiple data sets which may span multiple physical machines and physical disk drives, where all information collected about all points on the earth is replicated and stored. This way, all of the known and available information as of the most current time of receipt (e.g., from web crawler 108, image crawler 110 and/or data feeds 112) may be immediately retrieved from the database and presented to the user.

In another embodiment, the integrated database 102 may include a combination of both replicated information and reference links to data sources outside of the database, such as to a site on the Internet. An advantage of this structure is that a cached version of the data will be immediately available from the integrated centralized database 102, and reference links will point directly to the original data source to ensure that the latest version of the data is available.

Figure 2:
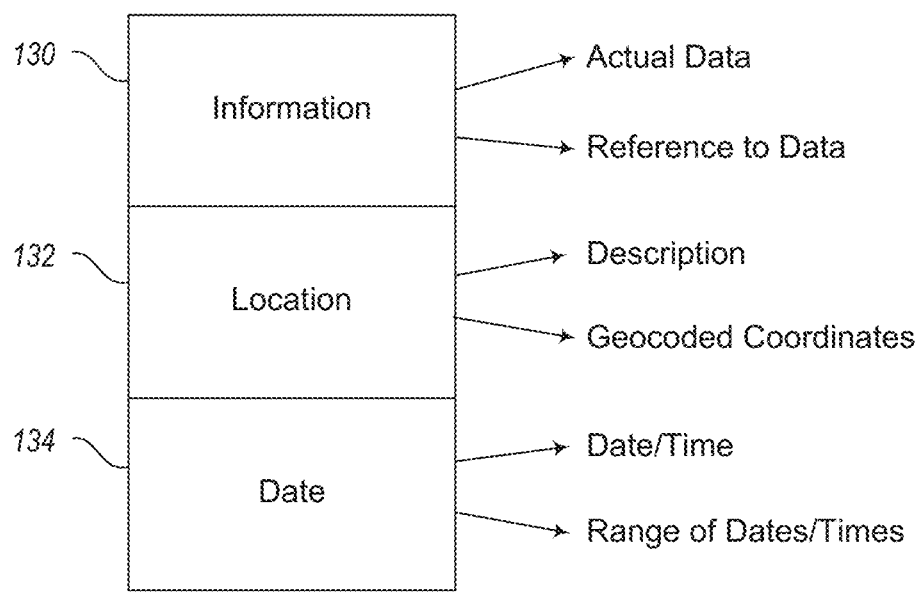
FIG. 2 is a diagram showing the components of a data item, in accordance with one or more embodiments.

Referring to FIG. 2, in one or more embodiments, each data item 410 has at least three individual attributes: information 130, location 132 and date 134. Information 130 includes of an actual data item and/or a reference to a data item stored at a location outside of the integrated database 102 where the information may be retrieved. For example, the reference to data may be a link or reference to a price at which a property associated with a particular point on the earth has ever been sold, all taxes ever levied on the property, all insurance policies underwritten for the property, and so on. It may also be the data itself, such as the type of license obtained, item purchased, etc.

The location 132 attribute refers to the locations on the earth to which the information refers or is associated with. This location information may be represented as a geocoded location, for example latitude/longitude. However, the location 132 may be a property street address, a parcel identifier, a ZIP code, a city, county, or state designation. In some cases, it may be a region identifier such as a climate zone, a marketing area, or a bounded area of a particular event such as a hailstorm or a fire. In addition, the location 132 may correspond to a demographic or socio-economic region, such as a region within a state where the average number of people in a household is 2.5, or a region where there is at least one person within the household over the age of 65, or where average income is above $50,000.

The location 132 attribute, in one embodiment, includes at least two fields: the first field indicates the location itself, as previously described, and the second field indicates the relationship of the location to the data. In the first field, the location itself may be described and stored in multiple formats. For example, in addition to being a parcel identifier or a property street address, it can also include the longitude and latitude of the boundaries of a polygon which encloses that particular parcel or property address. There are a number of other overlapping ways in which a geographic point can be defined. The relationship to the data or event will provide an indication of how that particular location is related to the actual information 130 itself. The location may be indicated as where the event occurred or that the information is a description of that particular address, in which case, the location 132 field attribute would refer to itself. Alternatively, this field of the location 132 attribute may refer to the source of the data which is in the information 130. For example, if a 911 call is made this is a single event, a single information; however, two data records can be obtained, one having the location from which the call originated and the field for the location 132 would be marked as the source of the data, and a separate record having the same event information 130 but whose location 132 has the field attribute that the information applies to that particular location, namely to itself. It is, thus, possible that a single piece of information 130, whether it is an event or data, may have multiple items stored because it is associated with multiple addresses or locations 132. Of course, the same location 132 may have multiple events associated with that address, as will be apparent since a single address will likely have a home owner's insurance policy, driver's license, voter registrations, mailing lists, etc., all having the same location 132, but having different information 130 associated with that location 132.

In some embodiments, the date 134 attribute identifies the date and time at which the data item is or was relevant. The date 134 attribute can correspond to a specific point in time, to a specific range of time, or it could be associated with multiple time ranges. For example, the tax records associated with a particular parcel of land, which contains a point on the earth of interest, may be associated with particular years, or a range of months between land assessment updates.

The processor 106 may generate the data items 410 based on data received from the data sources 116. For example, the processor 106 may receive an image of a particular point on earth from an image crawler 110. The processor 106 may analyze metadata received with the image to determine location information (such as, for example, latitude and longitude) associated with the image, as well as to determine a date that the image was taken. The processor 106 may then create a data item 410, which may have a standard format or structure, including the information 130 (i.e., the image), location 132 and date 134. This data item 410 may then be stored in the integrated centralized property database 102.

Figure 3:
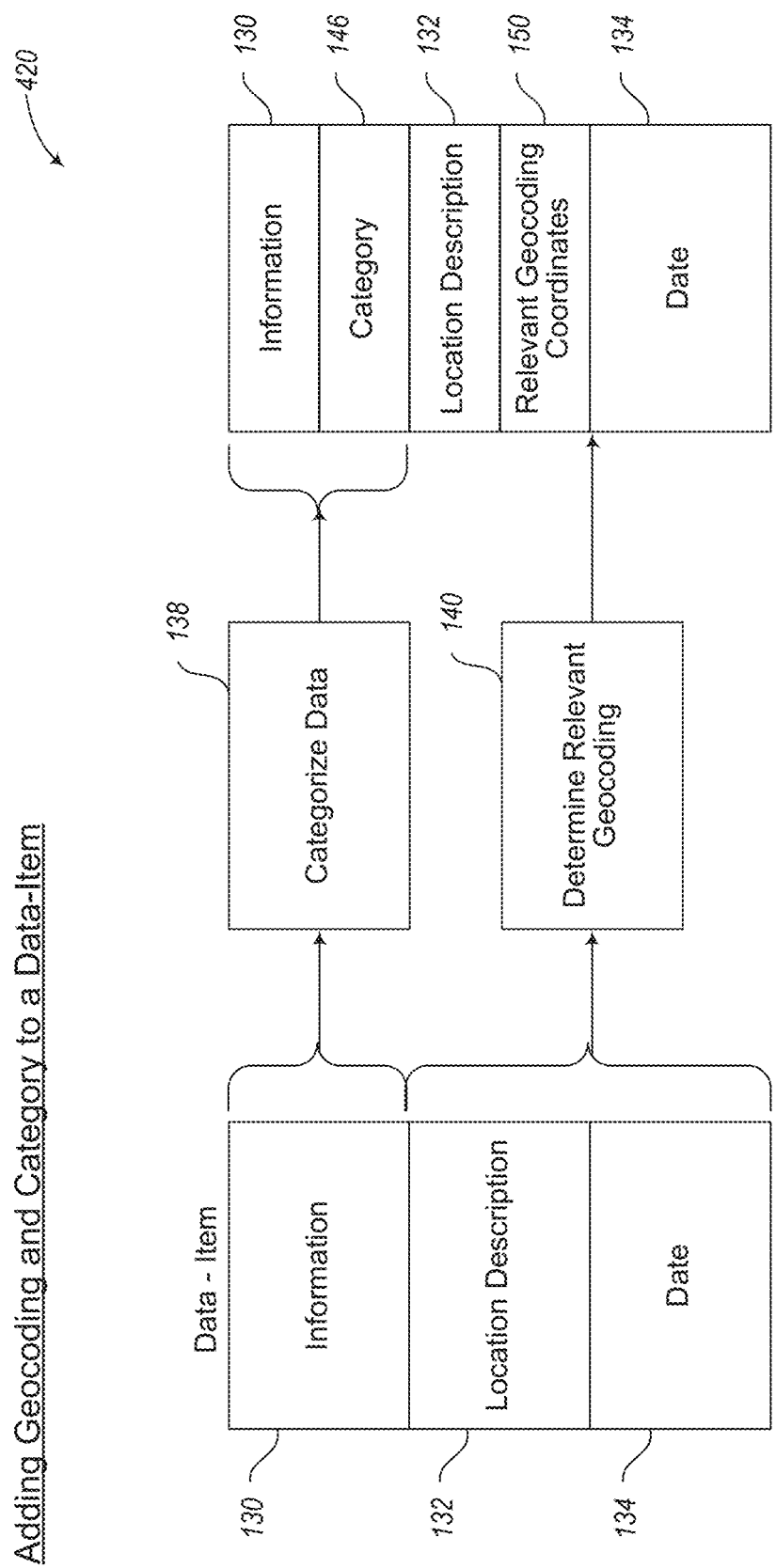
FIG. 3 is a block diagram illustrating a process for adding geocoding information and category information to a data item, in accordance with one or more embodiments.

FIG. 3 is a block diagram 420 illustrating a process for adding geocoding information and category information to a data item 410, in accordance with one or more embodiments. As shown in FIG. 3, additional attributes may be associated with the data item 410, and may be determined by examining other data item 410 attributes. For example, the processor 106 may receive information 130 and categorize 138 the information into one or more categories 146 for easier grouping. The category 146 information may be appended to or otherwise associated with the data item 410 and stored in the integrated centralized property database 102. Example categories 146 include, but are not limited to, insurance underwriting, insurance claims, tax information, property characteristics, crime, demographics, weather events, and so on.

The data item 410 may further be analyzed by the processor 106 to determine relevant geocoding 140. In some embodiments, the location 132 attribute and the date 134 attribute may be combined to produce one or more geocoded locations identified by latitude/longitude. In this way, information 130 associated with a named location 132 that represents different areas at different dates can be properly identified with specific points on the earth. For example, tax information associated with the address 199 Dry Creek Road, Napa, Calif. 94558 in 1968 may have referred to a 10-acre parcel of farm land, where the same address today may refer to a single family home that was subdivided from the 10 acres in 1989. In this example, the date 1968 together with the address would identify a range of geocoded locations to which 1968 tax information would be relevant, which is different than the geocoded locations associated with any current tax information. Therefore, in these embodiments, an updated data item 410 may include—in addition to information 130, location identifier 132 and date 134—a category 146 and one or more (e.g., a range of) geocoded coordinates 150.

Figure 4:
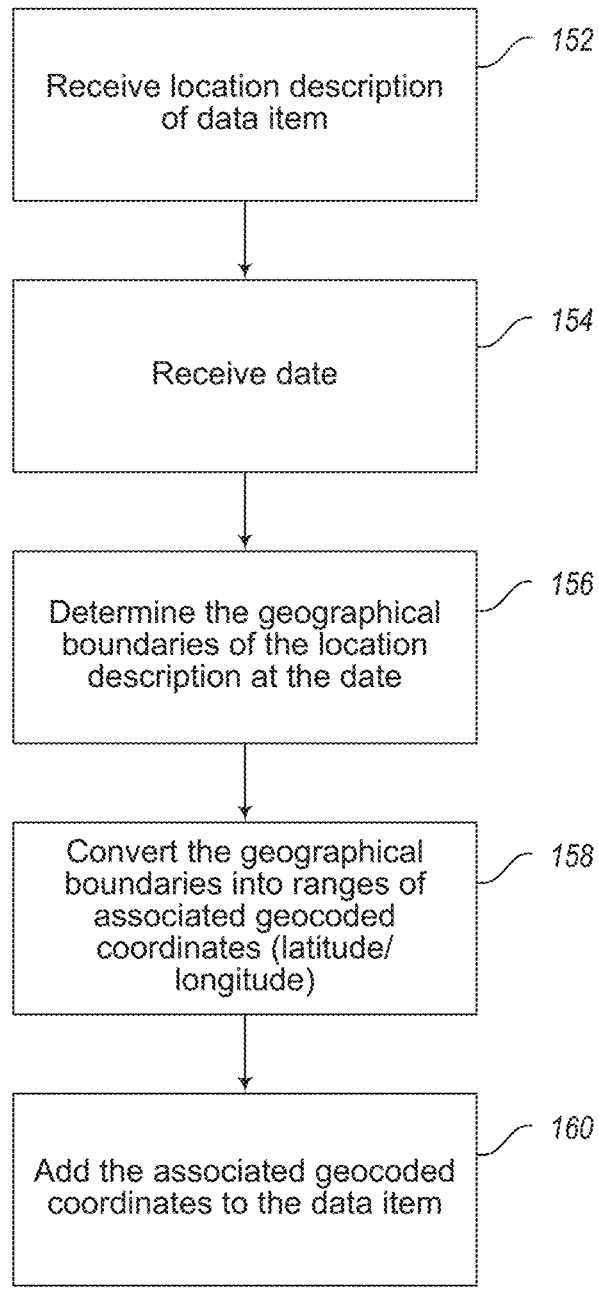
FIG. 4 is a flowchart illustrating a process for determining relevant geocoding information, in accordance with one or more embodiments.

FIG. 4 is a flowchart illustrating a process 430 for determining relevant geocoding information. At block 152, the process includes receiving a location description 132 of a data item 410. The location description 132 of the data item 410 may be received by the processor 106, and may be received from a web crawler 108, image crawler 110, data feeds 112 and/or update sources 114, any of which may have retrieved the location description 132 from data sources 116. As an example, the received location description 132 may be a neighborhood, a parcel, a lot, an address, or other such non-geocoded location descriptions.

At block 154, the processor 106 receives the date 134 associated with the location description 132. The date 134 may be received by the processor 106 from the same source (i.e., the web crawler 108, image crawler 110, data feeds 112, and/or update sources 114) that provided the location description 132. Alternatively, the date 134 may be determined by the processor 106, for example, by analyzing metadata, image analysis, text analysis, or the like.

At block 156, the processor 106 determines the geographical boundaries of the location description 132 at the date 134. The geographical boundaries, in at least some retrieved data items, may be absent from the location description 132 itself (e.g., the location description 132 may identify a neighborhood, parcel, lot, address, or the like). In such a case, the processor 106 may determine the geographical boundaries of the location at the date received at 154 utilizing various techniques. One such technique, for example, may involve comparing the location information with location information which may be stored in the integrated database 102, or in any other accessible database. For example, if the received location description 132 is a particular neighborhood in the city of Seattle, at block 156, the processor 106 may reference a Seattle neighborhood database (which may be a publicly-accessible database) to determine the streets or blocks which define a boundary for that neighborhood at the date received at block 154. Because property boundaries often change over time (e.g., neighborhoods, lots, census-defined areas, voting districts and the like), determining the geographical boundaries of the location description at the date, at block 156, enables accurate associations between the location description 132 and the date 134.

At block 158, the processor 106 converts the geographical boundaries determined at block 156 into ranges of associated geocoded coordinates (i.e., latitude and longitude). This may be accomplished, in some embodiments, by referencing one or more maps containing geocoded coordinates. For example, a city map or a street map may be superimposed onto a geocoding map containing latitude and longitude coordinates, and the processor 106 may thus determine the geocoded coordinates which correspond to the boundaries (e.g., street boundaries, parcel boundaries, etc.) which were determined at block 156.

At block 160, the determined geocoded coordinates associated with the location description 132 and date 134 are added to the data item 410. The updated data item 410 may thus be stored in the integrated database 102.

Figure 5:
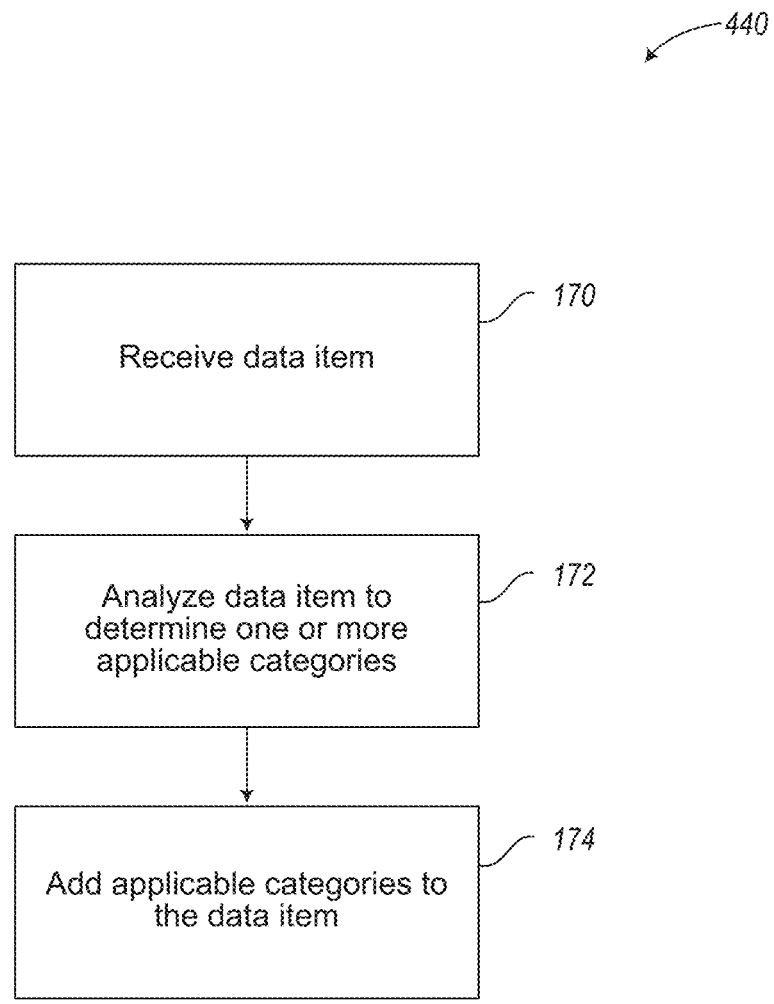
FIG. 5 is a flowchart illustrating a process for associating one or more categories to a data item, in accordance with one or more embodiments.

FIG. 5 is a flowchart illustrating a process 440 for associating one or more categories 146 to a data item 410. At block 170, the process includes receiving a data item 410. The data item 410 may be received by the processor 106, and may be received from a web crawler 108, image crawler 110, data feeds 112 and/or update sources 114, any of which may have retrieved the data item 410 from data sources 116.

At block 172, the processor 106 analyzes the data item 410 to determine one or more applicable categories 146 to which the data item 410 pertains or should be associated with. The processor 106 may employ various techniques for analyzing and determining applicable categories. For example, the processor 106 may analyze the information 130 and/or location description 132 included in the received data item 410, which may include, for example, textual information describing the location. The processor 106 may utilize any textual or other information processing techniques, including for example heuristic processes, to determine one or more categories 146 relevant to the data item 410. The processor 106 may access a categories database, which may be included in or otherwise accessible to the integrated database 102, to determine one or more categories 146 relevant to the data item 410. Examples of such categories include, but are not limited to, insurance underwriting, insurance claims, tax information, property characteristics, crime, demographics, weather events, and so on.

At block 174, the applicable categories 146 are added to the data item 410. The updated data item 410 may thus be stored in the integrated database 102, along with the associated category 146 information.

In some embodiments, "location information" refers not only to a specific latitude and longitude, but additionally includes vertical or Z-axis information (e.g., indicating a height above or a depth below the surface of the earth).

User Interface/Types of Queries

Referring again to the block diagram 400 of FIG. 1, property information contained in the integrated database 102 may be accessed by one or more users via a graphical user interface 120.

Integrated database 102 includes data items having particular location information (as discussed above), such that each of the data items are associated with a particular point on the earth, effectively making up a "globe" 104, or map of locations, with each information item being linked to one or more particular locations on the globe 104 or map.

Queries 118 may be received by the integrated database 102 from one or more user computer systems. The queries 118 may be provided by users through the user interface 120, and may be provided in a variety of forms. For example, a query 118 may be provided by inputting location information (e.g., latitude/longitude) and querying for all information associated with that particular point on the earth. Alternatively, the query 118 may specify particular types of information associated with the particular point on the earth to be returned, such as, for example, only insurance-related information, property zoning information, weather-related information, and so on.

The query 118 may specify a property location of interest by directly inputting location information, or by selecting a particular point on a map provided by the user interface 120 (e.g., the "X" shown in FIG. 1), or by selecting an area within the map (e.g., the area shown within the dotted lines in FIG. 1). An area within the map may be selected by, for example, a drawing tool provided through the user interface 120 which allows a user to draw polygons or various other shapes. Further, queries 118 may include Z-axis information (i.e., location information in a vertical direction). For example, a user may provide a query 118 to the integrated database 102 that specifies a particular latitude and longitude, and further specifies a depth or height of 10 meters to 100 meters. In such a case, the integrated database 102 will display all matching information to the user via the user interface 120.

The geographic location of a particular point can be described a number of ways. Generally, a latitude and longitude are more than sufficient to specify the particular location of an item. Latitudes and longitudes can have a number of decimal points specified that provide information regarding degrees, minutes, seconds, and subparts of seconds, as well as decimal degrees with a number points. The number of decimal points or subparts of seconds that a latitude or longitude specifies will reduce the geographic area of the point under consideration. For example, a latitude that is specified exactly in degrees, minutes, and seconds will be a fairly large area of land. For example, one minute equals the width of somewhat less than a mile, approximately 0.91 miles and one second equals approximately a width of 80 feet. A measure of latitude and longitude in seconds thus covers a point on the earth that is about 640 square feet. If a more precise location is to be identified, which is frequently the case, the latitude and longitude can be specified in fractions of a second or in the decimal format which can specify locations of particular points in the range of one square foot, a quarter of a square foot, or smaller.

In such a reference plane, latitude is generally considered an X data point and longitude a Y data point. Thus, with longitude and latitude acting as an X and Y reference grid, respectively, any particular location on the surface of the earth can be defined with a high degree of accuracy. For some locations, and some events, it may be desired to also provide a height or depth reference, which will be referred to herein as the Z axis. A plus Z represents a height above the surface of the earth and a minus Z represents a depth below the surface of the earth. Thus, the third floor of a building may have the same X and Y coordinates as the second and first floors of that building, but would have a different Z reference. Given the large number of apartment complexes, high-rise office buildings, and other events that may happen at various heights above the surface of the earth, the option to include a Z axis height provides significant benefits and a further ability to define the exact location of a particular event or data. Some events may also be a negative Z, such as may occur in mine shafts, the bottom of a lake, or some other location which is below the local surface of the earth at that point.

The references as provided herein to latitude and longitude refer to the surface of the earth at that particular geographic location. Thus, a longitude and latitude geographic location in with a high altitude, such as Denver or Breckenridge, would not include within it a Z axis measure if it were referring to the land that was at the surface of the earth at that location. Rather, the Z axis is for including a reference to an event or data that is above or below the local surface of the geographic earth surface feature at that location which may be either a ground or water, such as a lake, river, stream, or ocean.

In response to queries 118, the integrated database 102 may provide the relevant data overlaid on a map in the user interface 120. The data may include, for example, any data items 410 stored in the integrated database 102 having a location corresponding to a location provided by the query 118. Further, the user interface 120 may provide users an option to display only a particular type of data items 410, based on category 146 or the like. For example, a user of the user interface 120 may select to display only crime data, demographic data, school data, insurance data or so on.

The user interface 120 may further include a time scale 122, which allows a user to select (e.g., by moving a slider 122a) a particular time or range of times of interest. The time scale 122 may allow users to query 118 the integrated database 102 for information associated with particular points on the earth at any time, including decades, years, months, weeks, etc.

In one or more embodiments, users may query the system by identifying one or more points on the earth to receive information associated with those points, or may query the system by identifying information parameters to receive points on the earth associated with that information. Example queries include: do an address and a geolocation coordinate refer to the same parcel or spot? What demographics are associated with a point on the earth? What is the entire property history of a particular point? What is the current tax information for the parcel associated with this point? What building or construction permits have ever been issued for any parcel associated with this point of land? Who has ever held title to the land? Who has ever leased the land? In what areas of a county is the crime rate above 5%?

The system would also be valuable for insurance carriers. For example, for underwriters, what is the insurance claim history for properties at this location? Is there evidence of a land depression filled up around this location? Have there ever been floods at this location? What is the grade of the earth at this point? Have oil tanks ever been buried close to this location, or have oil lines fed this location at any time in the past? Do structures near this location exhibit evidence of moss buildup or other evidence of lack of upkeep?

In one or more embodiments, the data aggregation system may be queried using a structured query language, or queries 118 may be generated through the graphical user interface 120.

Computing System

Figure 6:
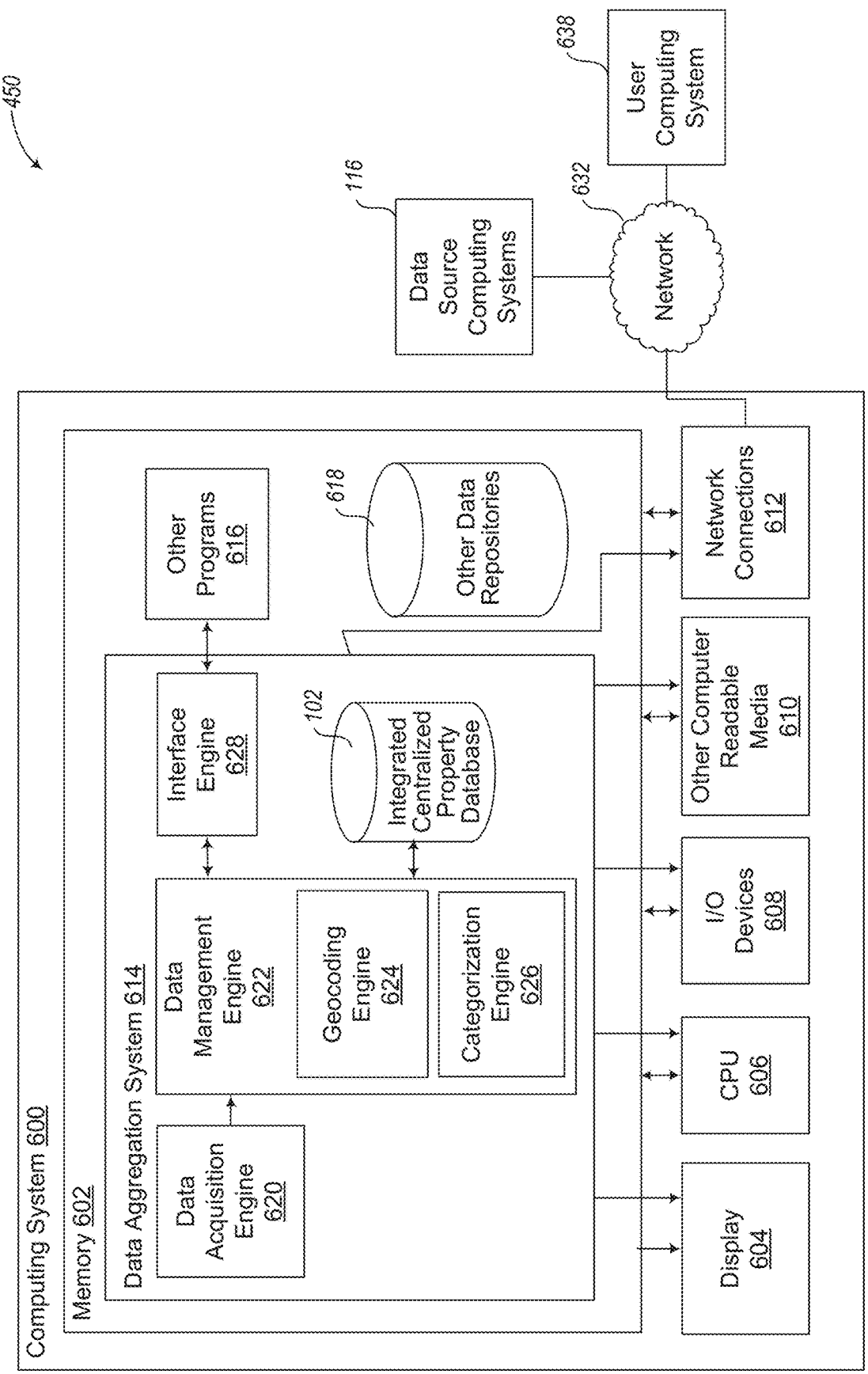
FIG. 6 is a block diagram illustrating a computing system for managing and providing access to the integrated centralized property database, in accordance with one or more embodiments.

FIG. 6 is a block diagram 450 showing a computing system 600 for managing and providing access to the integrated centralized property database 102, according to one or more embodiments.

The computing system 600 may include one or more distributed computing systems. In addition, each block shown may represent one or more such blocks as appropriate to a specific embodiment, or may be combined with other blocks. Moreover, in one example embodiment, the various components of a data aggregation system 614 may physically reside on one or more machines, which use standard inter-process communication mechanisms (e.g., TCP/IP) to communicate with each other. Further, the data aggregation system 614 may be implemented in software, hardware, firmware, or in any combination thereof to achieve the capabilities described herein.

In the embodiment shown, the computing system 600 includes a computer memory ("memory") 602, a display 604, one or more Central Processing Units ("CPU") 606, Input/Output devices 608 (e.g., keyboard, mouse, joystick, track pad, CRT or LCD display, and the like), other computer-readable media 610, and network connections 612. A data aggregation system 614 is shown residing in the memory 602. In other embodiments, some portion of the contents or some or all of the components of the data aggregation system 614 may be stored on and/or transmitted over the other computer-readable media 610. The components of the data aggregation system 614 preferably execute on one or more CPUs 606 and generate data items 410, determine relevant geocoding 140, and categorize data 138, as described herein. Other code or programs 616 (e.g., a Web server, a database management system, and the like) and potentially other data repositories, such as data repository 618 (which may include, for example, a globe 104 or map including associated geocoding information), may also reside in the memory 602 or may otherwise be accessible to the data aggregation system 614, and preferably execute on one or more CPUs 606. All of the components in FIG. 6 may not be required for each implementation. Some inputs to the data aggregation system 614 may be automatically generated and/or provided (e.g., inputs from web crawlers 108, image crawlers 110, data feeds 112, etc.), but other inputs may be entered manually to supplement data acquired through automated means.

As shown in FIG. 6, the data aggregation system 614 may include a data acquisition engine 620; a data management engine 622; a geocoding engine 624 and categorization engine 626 within, or as part of, the data management engine 622; an interface engine 628; and an integrated centralized property database 102.

The data acquisition engine 620 performs at least some of the functions described herein, with respect to the processes described herein. In particular, the data acquisition engine 620 interacts with the data sources 116 to obtain data items 410, or information associated with particular points on the earth, and provides such information to the data management engine 622 for further processing.

The data management engine 622 performs at least some of the functions described herein. In particular, the data management engine 622 receives data items 410 obtained by the data acquisition engine 620, adds category information to the data item 410 (e.g., as shown and described with respect to FIG. 3, herein) by the categorization engine 626, and determines and adds relevant geocoding (e.g., as shown and described with respect to FIG. 4, herein) by the geocoding engine 624.

The data management engine 622, after processing obtained data items 410 as described herein, provides the data items to the integrated centralized property database 102 for storage and retrieval in response to user queries 118.

In addition, the data aggregation system 614 interacts via a communications network 632 with data source computing systems 634 and/or one or more user computing systems 638. Communications network 632 may utilize one or more protocols to communicate via one or more physical networks, including local area networks, wireless networks, dedicated lines, intranets, the Internet, and the like.

User computing systems 638 may be computer systems utilized by any user of the data aggregation system 614, including, for example, insurance companies, real estate professionals, builders, parties interested in conducting property transactions, and so on.

The data acquisition engine 620 may obtain data items 410, for example, through communication via communications network 632 with data source computing systems 634. Users may utilize one or more user computing systems 638 to access the data aggregation system 614 and query the integrated centralized property database 102, for example, via the user interface 120.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
searching for and retrieving a plurality of data items regarding geographic locations including by:
examining internet-based images of geographic locations and metadata associated with the internet-based images; and
examining websites for data concerning regions associated with particular geographic locations;
processing the plurality of data items to determine corresponding geocoding information for the plurality of data items;
associating each of the plurality of data items with one or more geographic location identifiers of a particular geographic point based on the determined geocoding information;
associating the plurality of data items with one or more time identifiers, including one or more time or time periods, indicative of a time history of an associated data item regarding the associated geographic point;
storing the plurality of data items with the associated one or more geographic location identifiers and the associated one or more time identifiers in a data aggregation system;
receiving, by at least one processor, a query regarding a geographic location and including time information;
retrieving, from the data aggregation system, data items having associated geographic location identifiers matching the received geographic location and having associated time identifiers matching the received time information; and
outputting the retrieved data items.

2. The method of claim 1, wherein the one or more geographic location identifiers include latitude and longitude coordinates of a surface of the earth.

3. The method of claim 2, wherein the one or more geographic location identifiers further include at least one of a height above or a depth below the surface of the earth.

4. The method of claim 1, wherein the received geographic location includes a region on the earth.

5. The method of claim 4, wherein the region on the earth is identified by multiple geocoded locations, the multiple geocoded locations described in at least latitude and longitude coordinates.

6. The method of claim 1, wherein the time information of the query includes one or more time periods.

7. The method of claim 1, wherein the one or more location identifiers include content external to the data aggregation system.

8. The method of claim 1, wherein the stored data items include at least one of: tax data, building code data, weather data, insurance data, crime data, survey data, school data, demographic data and property data.

9. A system, comprising:
a memory;
a graphical user interface for displaying a geographical map stored in the memory;
an integrated centralized property database stored in the memory; and
a computer processor configured to execute code that causes the computer processor to:
receive through the graphical user interface a query including a geographic location identifier comprising an area selected within the geographical map displayed on the graphical user interface by a user drawing a polygon on the geographical map;
receive from a user a time period identifier including one or more time or time periods, indicative of a time history of an associated data item regarding the associated geographic point on earth,
retrieve from the integrated centralized property database location data, the location data including data associated with the geographic location identifier of a geographic location on the earth, and associated with the received time period identifier, and
provide the retrieved location data to the user via the graphical user interface.

10. The system of claim 9, the computer processor further configured to execute code that causes the computer processor to:
retrieve parcel information from the integrated centralized property database;
compare the retrieved parcel information with the location data to determine parcels associated with the geographic location identifier; and
output the parcels associated with the geographic location identifier.

11. The system of claim 10, the computer processor further configured to execute code that causes the computer processor to:
retrieve insurance policy information from the integrated centralized property database;
compare the retrieved insurance policy information with the parcels associated with the geographic location identifier to determine the insurance policies associated with the geographic location identifier; and
output the insurance policies associated with the geographic location identifier.

12. A system, comprising:
an integrated centralized property database stored on computer-readable storage media; and
at least one computer processor communicatively coupled with the integrated centralized property database, the at least one computer processor configured to:
search for and retrieve a plurality of data items regarding geographic locations including by:
examining internet-based images of geographic locations and metadata associated with the internet-based images; and
examining websites for data concerning regions associated with particular geographic locations;
process the plurality of data items to determine corresponding geocoding information for the plurality of data items;
associate each of the plurality of data items with one or more geographic location identifiers of a particular geographic point based on the determined geocoding information;
associate the plurality of data items with one or more time identifiers, including one or more time or time periods, indicative of a time history of an associated data item regarding the associated geographic point;
store, in the integrated centralized property database, the plurality of data items, associated with the one or more geographic location identifiers and associated with the one or more time identifiers;
receive, from a user computer system, a query of a geographic location and time information indicative of the time history of an associated data item regarding the associated geographic point on earth;
retrieve, from the integrated centralized property database, data items having associated geographic location identifiers matching the received geographic location and having associated time identifiers matching the received time information; and
provide the retrieved data items to the user computer system via a graphical user interface.

13. The system of claim 12, wherein the one or more geographic location identifiers include latitude and longitude coordinates.

14. The system of claim 13, wherein the one or more geographic location identifiers further include Z-axis coordinates, wherein the Z-axis coordinates are indicative of location above or below a surface of the earth.

15. The system of claim 12, wherein the time identifier includes one or more time periods.

16. The system of claim 12, wherein the one or more geographic location identifiers are associated with content external to the system.

17. The system of claim 12, wherein the stored data items include at least one of: tax data, building code data, weather data, insurance data, crime data, survey data, school data, demographic data and property data.

* * * * *